United States Patent
Boyer

(10) Patent No.: US 11,328,686 B2
(45) Date of Patent: May 10, 2022

(54) SYSTEM AND METHOD FOR CONTROL OF AN AIRCRAFT CABIN DISPLAY

(71) Applicant: BOMBARDIER INC., Dorval (CA)

(72) Inventor: Alain Boyer, Pierrefonds (CA)

(73) Assignee: BOMBARDIER INC., Dorval (CA)

( * ) Notice: Subject to any disclaimer, the term of this patent is extended or adjusted under 35 U.S.C. 154(b) by 34 days.

(21) Appl. No.: 16/709,095

(22) Filed: Dec. 10, 2019

(65) Prior Publication Data
US 2020/0193933 A1 Jun. 18, 2020

Related U.S. Application Data

(60) Provisional application No. 62/778,340, filed on Dec. 12, 2018.

(51) Int. Cl.
- *G09G 5/02* (2006.01)
- *B64D 11/00* (2006.01)
- *G09G 5/10* (2006.01)

(52) U.S. Cl.
CPC .......... *G09G 5/02* (2013.01); *B64D 11/0015* (2013.01); *G09G 5/10* (2013.01); *G09G 2354/00* (2013.01)

(58) Field of Classification Search
CPC ........ G09G 5/02; G09G 5/10; G09G 2354/00; B64D 11/0015
See application file for complete search history.

(56) References Cited

U.S. PATENT DOCUMENTS

| | | | |
|---|---|---|---|
| 8,064,120 B2 | 11/2011 | Callahan et al. | |
| 9,976,726 B2 | 5/2018 | Ash et al. | |
| 10,023,028 B2 | 7/2018 | Bugno et al. | |
| 2008/0042012 A1* | 2/2008 | Callahan | B64C 1/1484 |
| | | | 244/129.3 |
| 2009/0284598 A1* | 11/2009 | Busch | B60R 1/12 |
| | | | 348/148 |
| 2015/0077337 A1 | 3/2015 | Coto-Lopez et al. | |
| 2015/0170604 A1* | 6/2015 | Iwagaki | G09G 5/02 |
| | | | 345/589 |
| 2015/0354790 A1* | 12/2015 | Ash | B64D 47/02 |
| | | | 362/471 |
| 2017/0286037 A1* | 10/2017 | Sizelove | G06F 3/14 |
| 2018/0182314 A1 | 6/2018 | Staton et al. | |
| 2018/0281673 A1 | 10/2018 | Garing et al. | |
| 2019/0285785 A1* | 9/2019 | Ockenfuss | G02B 5/281 |
| 2020/0070981 A1* | 3/2020 | Bachhuber | B64D 11/0015 |
| 2020/0159081 A1* | 5/2020 | Ahn | G03B 21/62 |
| 2021/0206509 A1* | 7/2021 | Hack | B60Q 3/43 |

* cited by examiner

*Primary Examiner* — Terrell M Robinson
(74) *Attorney, Agent, or Firm* — Norton Rose Fulbright Canada LLP

(57) ABSTRACT

Methods and systems for controlling an aircraft cabin display are described herein. The method comprises obtaining a reflected color on a surface adjacent to a cabin window of an aircraft, generating an image having an image color in accordance with the reflected color on the surface adjacent to the cabin window, and displaying the image having the image color on a display device covering the cabin window.

15 Claims, 12 Drawing Sheets

SYSTEM AND METHOD FOR CONTROL OF AN AIRCRAFT CABIN DISPLAY

CROSS-REFERENCE TO RELATED APPLICATIONS

The present application claims the benefit of U.S. Provisional Patent Application No. 62/778,340 filed on Dec. 12, 2018, the contents of which are hereby incorporated by reference.

TECHNICAL FIELD

The present disclosure relates generally to aircraft cabin display systems and more particularly, to aircraft cabin display systems overlaid on aircraft cabin windows and control thereof.

BACKGROUND OF THE ART

Electrochromic and smart windows are used in aircraft to block out light from the outside. When activated, a dark or monochromic, tinted surface is obtained on each window. These surfaces are in stark contrast to the inner walls of the aircraft. In addition, when some windows are activated and others are not, a non-uniform look is created along the sidewall of the aircraft.

Therefore, improvements are needed.

SUMMARY

In accordance with a broad aspect, there is provided a method for controlling an aircraft cabin display. The method comprises obtaining a reflected color on a surface adjacent to a cabin window of an aircraft, generating an image having an image color in accordance with the reflected color on the surface adjacent to the cabin window, and displaying the image having the image color on a display device covering the cabin window.

In some embodiments, obtaining the reflected color on the surface adjacent to the cabin window comprises measuring the reflected color. In some embodiments, obtaining the reflected color on the surface adjacent to the cabin window comprises retrieving the reflected color from a storage medium.

In some embodiments, the method further comprises obtaining a reflected intensity of light at the surface adjacent to the cabin window, and wherein generating an image comprises generating the image with an image intensity in accordance with the reflected intensity.

In some embodiments, measuring a reflected color on a surface comprises measuring a first reflected color at a first position on the surface and measuring a second reflected color at a second position on the surface, and wherein generating an image comprises generating a first portion of the image in accordance with the first reflected color and generating a second portion of the image in accordance with the second reflected color.

In some embodiments, a color gradient is applied across the image displayed on the display device.

In some embodiments, the first position and the second position on the surface adjacent to the cabin window are on opposite sides of the cabin window.

In some embodiments, the display extends over the cabin window and a plurality of additional cabin windows adjacent to the cabin window, and wherein displaying the image comprises displaying the image on a portion of the display covering the cabin window.

In some embodiments, the method further comprises obtaining additional reflected colors on respective surfaces adjacent to the plurality of additional cabin windows, generating respective additional images in accordance with the additional reflected colors, and displaying the additional images on respective portions of the display covering the additional cabin windows.

In some embodiments, the plurality of additional cabin windows are separated by cabin wall sections, and further comprising rendering the display transparent over portions of the display corresponding to the cabin wall sections.

In some embodiments, the method further comprises enabling the displaying of the image upon detection of a predetermined level of translucency of the cabin window.

In some embodiments, the method is applied dynamically as lighting conditions inside the aircraft cabin change.

In accordance with another broad aspect, there is provided a system for controlling an aircraft cabin display. The system comprises a processing unit and a non-transitory computer-readable medium having stored thereon program code. The program code is executable by the processing unit for obtaining a reflected color on a surface adjacent to a cabin window of an aircraft, generating an image having an image color in accordance with the reflected color on the surface adjacent to the cabin window, and displaying the image having the image color on a display device covering the cabin window.

In some embodiments, obtaining the reflected color on the surface adjacent to the cabin window comprises measuring the reflected color. In some embodiments, obtaining the reflected color on the surface adjacent to the cabin window comprises retrieving the reflected color from a storage medium.

In some embodiments, the program code is further executable for obtaining a reflected intensity of light at the surface adjacent to the cabin window, and wherein generating an image comprises generating the image with an image intensity in accordance with the reflected intensity.

In some embodiments, measuring a reflected color on a surface comprises measuring a first reflected color at a first position on the surface and measuring a second reflected color at a second position on the surface, and wherein generating an image comprises generating a first portion of the image in accordance with the first reflected color and generating a second portion of the image in accordance with the second reflected color.

In some embodiments, a color gradient is applied across the image displayed on the display device.

In some embodiments, the first position and the second position on the surface adjacent to the cabin window are on opposite sides of the cabin window.

In some embodiments, the display extends over the cabin window and a plurality of additional cabin windows adjacent to the cabin window, and wherein displaying the image comprises displaying the image on a portion of the display covering the cabin window.

In some embodiments, the program code is further executable for obtaining additional reflected colors on respective surfaces adjacent to the plurality of additional cabin windows, generating respective additional images in accordance with the additional reflected colors, and displaying the additional images on respective portions of the display covering the additional cabin windows.

In some embodiments, the plurality of additional cabin windows are separated by cabin wall sections, and further comprising rendering the display transparent over portions of the display corresponding to the cabin wall sections.

In some embodiments, the program code is further executable for enabling the displaying of the image upon detection of a predetermined level of translucency of the cabin window.

In accordance with yet another broad aspect, there is provided an aircraft cabin display system comprising a display device covering a cabin window of the aircraft, and a controller operatively connected to the display device and configured for obtaining a reflected color on a surface adjacent to a cabin window of an aircraft and generating and providing to the display device an image having an image color in accordance with the reflected color as measured on the surface adjacent to the cabin window.

In some embodiments, the system further comprises a color measuring device coupled to the controller and configured for measuring the reflected color on the surface adjacent to the cabin window.

In some embodiments, the system further comprises a light intensity measuring device operatively connected to the controller and configured for measuring a reflected intensity of light at the surface adjacent to the cabin window, and wherein the controller is further configured for generating the image with an image intensity in accordance with the reflected intensity.

In some embodiments, the light intensity measuring device is a luxmeter.

In some embodiments, the color measuring device is a color meter.

In some embodiments, the display device is an Organic Light Emitting Diodes (OLED) display.

In some embodiments, the display device operates in a first mode as a transparent screen, a second mode for color matching, and a third mode as an inflight entertainment system.

In some embodiments, the display device extends over the cabin window and a plurality of additional cabin windows adjacent to the cabin window.

In some embodiments, the system further comprises additional display devices covering additional cabin windows.

In some embodiments, the system further comprises additional color detection devices adjacent to each one of the additional cabin windows.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
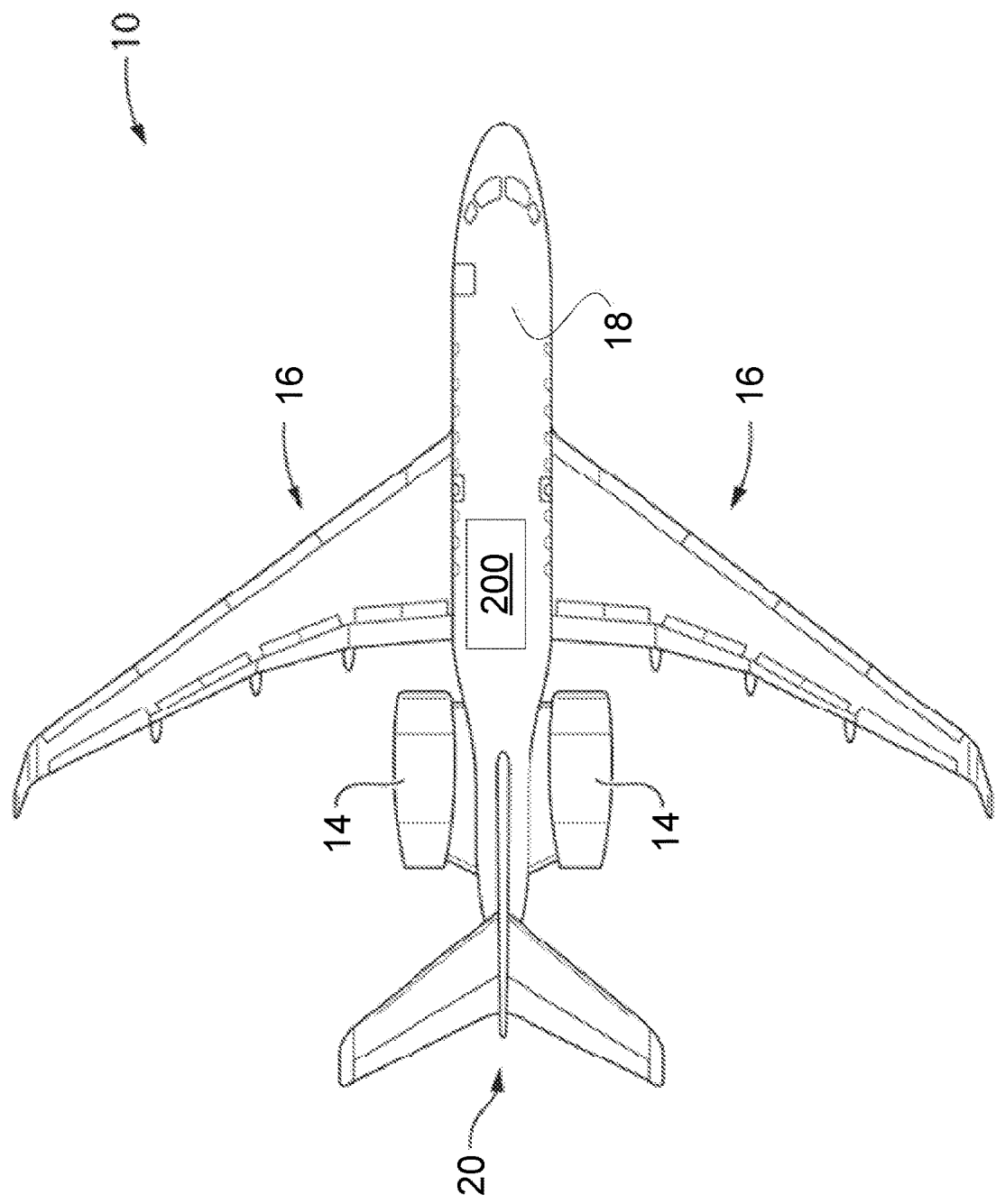
FIG. 1 is a top view of an aircraft, in accordance with an illustrative embodiment.

FIG. 1 is a top view of an exemplary aircraft 10 which can comprise an aircraft cabin display system 200 (shown schematically). Aircraft 10 can be any type of aircraft such as corporate, private, commercial and passenger aircraft suitable for civil aviation. Aircraft 10 can be manned or unmanned (e.g., drone). For example, aircraft 10 can be a (e.g., ultra-long range) business jet or a narrow-body, twin-engine jet airliner. Aircraft 10 can be a fixed-wing aircraft comprising one or more engines 14. Alternatively, aircraft 10 can be a glider with no engines. Aircraft 10 can comprise wings 16, fuselage 18 and empennage 20. One or more of engines 14 can be mounted to fuselage 18. Alternatively, or in addition, one or more of engines 14 can be mounted to wings 16. Aircraft 10 can comprise a passenger cabin and a cockpit inside fuselage 18.

Figure 2:
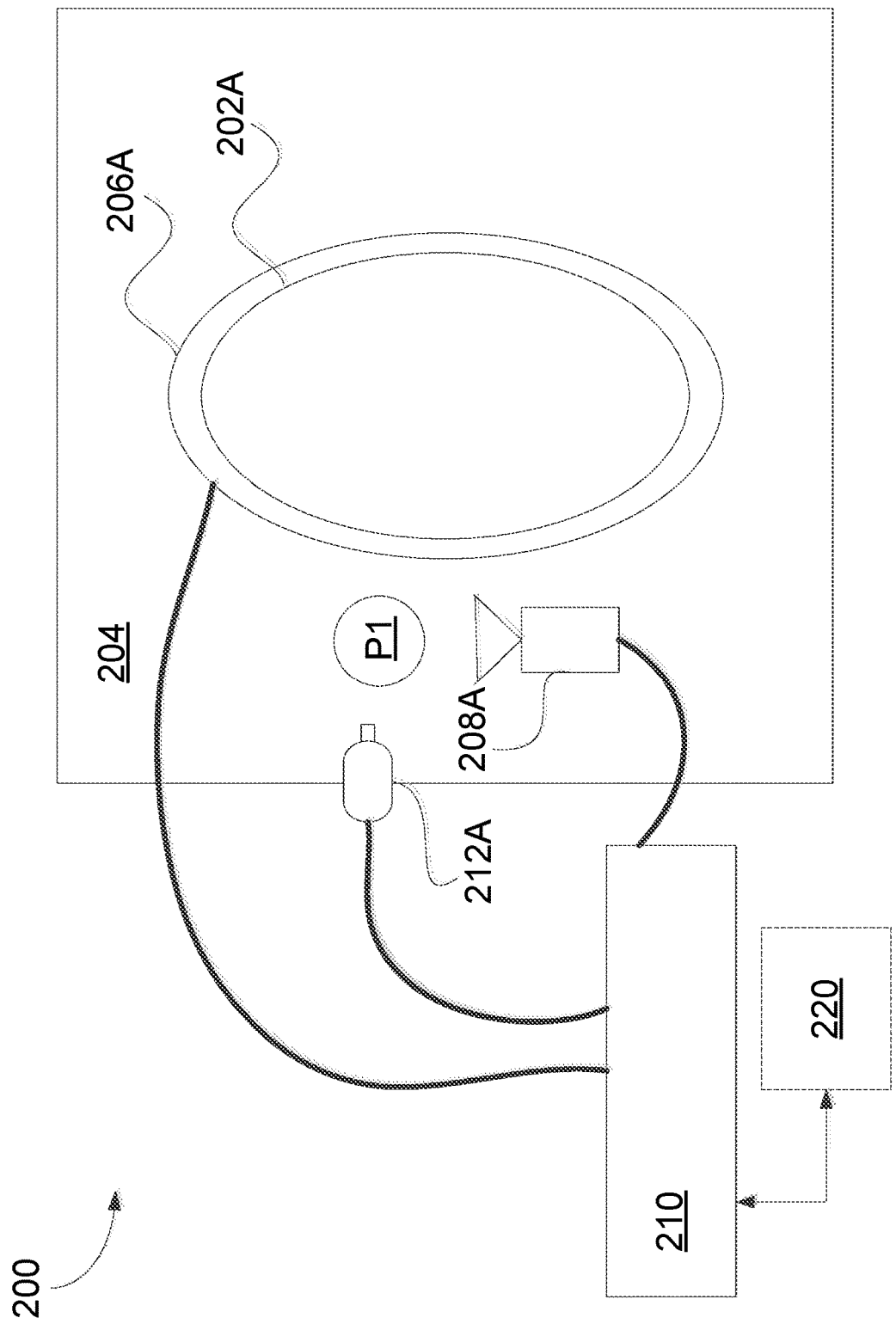
FIG. 2 is a schematic diagram of an aircraft cabin display system, in accordance with an illustrative embodiment.

Referring now to FIG. 2, there is illustrated an exemplary embodiment of the aircraft cabin display system 200. At least one cabin window 202a is formed within a sidewall 204 of the aircraft 10. In some embodiments, the cabin window 202a is a transparent or translucent window that allows the passage of light and through which a passenger may see outside of the aircraft 10. The window may be made of glass, plastic, fiberglass, acrylic, plexi-glass or any other material capable of having translucent or transparent properties. In some embodiments, the window 202a is provided with variable opacity, such as by altering its light transmission properties when voltage, light, or heat is applied. The window 202a may change from blocking some or all wavelengths of light to letting some or all wavelengths of light pass through. Some example technologies for providing variable opacity are electrochromic, photochromic, thermochromic, suspended particle, micro-blind, nanocrystal, and polymer dispersed liquid crystal devices. Other technologies are also considered.

A display device 206a covers cabin window 202a and is operatively connected to a controller 210. In some embodiments, the display device 206a is a layer that is separate from the cabin window 202a, such as a film or a screen that lies on top of or behind the window 202a. In other embodiments, the display device 206a is embedded in the cabin window 202a. For example, the display device 206a may be one of multiple layers forming an assembly for cabin window 202a, and be surrounded with other structural components. Although illustrated as an ellipse, the display device 206a may take on another shape, such as but not limited to rectangular, square, circular, other geometrical shapes, and other non-regular shapes. Various technologies may be used for the display device 206a, such as but not limited to light-emitting diodes (LEDs), liquid crystal displays (LCD), organic light-emitting diodes (OLEDs), surface-conduction electron-emitter display (SED), plasma display panel (PDP), electroluminescent display (ELD), and laser video display.

In some embodiments, at least one color measuring device 208a is positioned to measure a reflected color at a position P1 on a surface adjacent to the cabin window 202a. The color measuring device 208a may be attached to a structure of the sidewall 204 and pointed towards a specific position on the surface of the sidewall 204 adjacent to the window 202a. The color measuring device 208a may also be embedded in or attached to a structure of the window 202a and pointed towards a specific position on the surface of the sidewall 204 adjacent to the window 202a. Also alternatively, the color measuring device 208a may be attached to another structure inside the cabin of the aircraft 10, such as a passenger seat, a light fixture, a ceiling structure, and the like. The distance between the color measuring device 208a and the position P1 on the surface where reflected light is measured is set in accordance with the measuring range of the device 208a.

In some embodiments, the color measuring device 208a is a color meter for measuring surface colors, such as a spectral color meter for RGB or HSL values, or a color meter according to CIELab standards. The color measuring device 208a may be adapted for a specific type of material, for example for measuring textile or plastic, depending on the material covering the sidewall 204 at P1 on the surface adjacent to the cabin window 202a.

The color measuring device 208a is operatively connected to the controller 210 for transmitting to the controller 210 the measured reflected color. The controller 210 is configured for generating an image for display on the display device 206a. The image has an image color that matches the reflected color as measured by the color measuring device 208a at P1. The controller provides the image to the display device 206a and the display device 206a displays the image. The displayed image allows the window 202a to visually blend with the surface adjacent to the window 202a, giving the sidewall 204 a more uniform look. In some embodiments, the displayed image comprises a pattern that corresponds to a pattern of the surface adjacent to the window 202a. For example, the sidewall 204 may have inlays and textures that are reproduced in an image, using a pre-programmed surface pattern. The image color of the image comprising the pre-programmed surface pattern is set to match the reflected color as measured by the color measuring device 208a at P1.

In some embodiments, the color measuring device 208a is omitted from the system 200 and the reflected color is obtained by the controller 210 from a storage medium 220, which may be separate from or incorporated within the controller 210. For example, one or more measurement of the reflected color on the surface adjacent to the window 202a may be performed during a calibration phase, which can take place as the aircraft is manufactured or at any other time prior to operation of the system 200. In some embodiments, a plurality of measurements of the reflected color on the surface adjacent to the window 202a are taken during the calibration phase, each one corresponding to a different set of lighting conditions (and possibly other parameters) within the cabin of the aircraft. During operation, the controller 210 may be configured to access the storage medium 220 and select the reflected color as a function of current cabin lighting conditions and/or other parameters. Other embodiments may also apply.

In some embodiments, a light intensity measuring device 212a is provided for measuring a reflected intensity of light at P1 on the surface adjacent to the window 202a. The light intensity measuring device 212a may be attached to a structure of the sidewall 204 and pointed towards a specific position on the surface of the sidewall 204 adjacent to the window 202a. The light intensity measuring device 212a may also be embedded in or attached to a structure of the window 202a and pointed towards a specific position on the surface of the sidewall 204 adjacent to the window 202a. Also alternatively, the light intensity measuring device 212a may be attached to another structure inside the cabin of the aircraft 10, such as a passenger seat, a light fixture, a ceiling structure, and the like. The distance between the light intensity measuring device 212a and the position P1 is set in accordance with the measuring range of the device 212a.

In some embodiments, the light intensity measuring device 212a is a lux meter for measuring luminous flux per unit area, or illuminance, at P1. In some embodiments, the light intensity measuring device 212a is a light meter for measuring the amount of light reflected at P1. Examples include a multifunction lux meter, an LED light meter, an LED lux meter, and the like.

In some embodiments, the reflected intensity is pre-measured for a given set of cabin lighting conditions (and possibly other parameters, such as time of day), and stored in the storage medium 220 for retrieval by the controller 210.

While illustrated as separate devices, the light intensity measuring device 212a and the color measuring device 208a may be provided as a single device capable of performing both measurements.

The light intensity measuring device 212a is operatively connected to the controller 210 for transmitting to the controller 210 the measured reflected light intensity. The controller 210 is configured for matching the light intensity of the image generated with the reflected light intensity as measured at P1, thus enhancing the visual blending of the window 202a with the sidewall 204 and the uniformity thereof.

In some embodiments, the controller 210 is configured for applying a gradient to the color and/or light intensity of the image displayed on the display device 206a, as a function of one or more factors. For example, a gradient may be applied to the image on the display device 206a as a function of a distance of a pixel on the display device 206a with the position P1 at which the reflected color and/or light intensity is measured. Pixels that are further away from P1 would be dimmed compared to pixels that are closer to P1, or vice versa. A wash light effect may be created on the window 202a in this manner. Other factors that may be used to apply the gradient across the image on the display device 206a are a distance of a pixel from a surrounding light source, or a reflectivity of the surface at P1. Using the distance from a surrounding light source, a top to bottom dimming effect may be created on the window 202a, whereby the upper section of the generated image has a higher light intensity than a lower section of the generated image.

The controller 210 may communicate with the display device 206a, the color measuring device 208a, and the light intensity measuring device 212a in a variety of ways. For example, the controller 210 may communicate via wire-based technology, such as electrical wires or cables, and/or optical fibers. The controller 210 may also communicate via wireless means, such as RF, infrared, W-Fi, Bluetooth, cellular radio, and others. As such, communication with the controller 114 may therefore traverse a network, such as the Internet, the Public Switch Telephone Network (PSTN), a cellular network, or others known to those skilled in the art. In some embodiments, the controller 210 is part of a cabin management system (CMS) of the aircraft 10.

Figure 3:
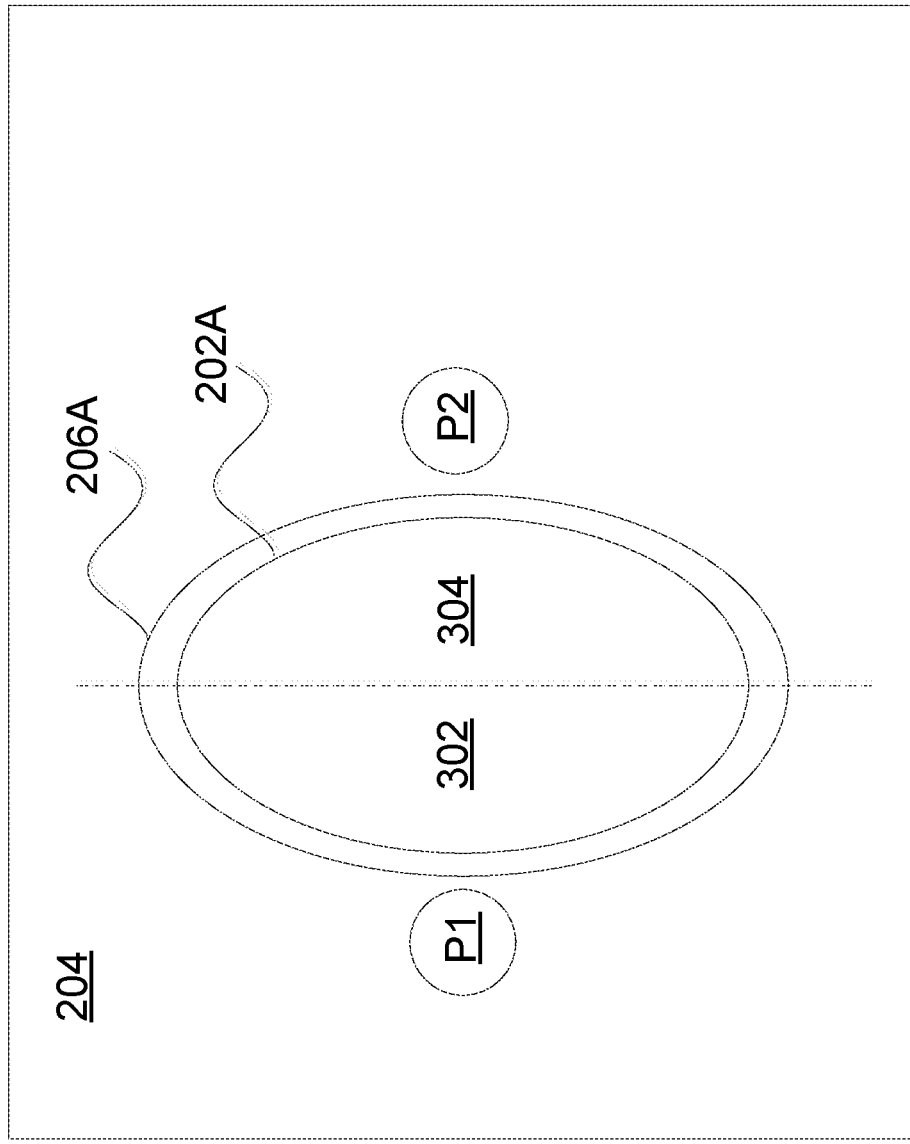
FIG. 3 is a schematic diagram to illustrate generation of an image in accordance with two measurement positions, in accordance with an illustrative embodiment.

Referring to FIG. 3, there is illustrated an example of an image generated by the aircraft cabin display system 200. In this example, color and/or light intensity are measured at two distinct positions and the image displayed on display device 206a is generated in accordance with at least two measurements. For ease of discussion, the color measuring device 208a and the light intensity measuring device 212b have been removed. As shown, first measurements of reflected color and/or light intensity are taken at position P1 and second measurements of reflected color and/or light intensity are taken on an opposite side of the window 202a at position P2. The measured reflected color and/or measured reflected light intensity at P1 and P2 are sent to the controller 210. The image generated by the controller is composed of two portions 302, 304. A first portion 302 has an image color that matches the reflected color measured at P1 and/or a light intensity that matches the reflected light intensity measured at P1. A second portion 304 has an image color that matches the reflected color measured at P2 and/or a light intensity that matches the reflected light intensity measured at P2. The first portion 302 of the image is disposed adjacent to P1. The second portion 304 of the image is disposed adjacent to P2.

While the example of FIG. 3 illustrates obtaining measurements at two positions, measurements for reflected color and/or reflected light intensity may be obtained at three or more positions disposed around the surface surrounding the window 202a. In some embodiments, the controller 210 is configured to generate the image with a number of portions corresponding to the number of reflected color measurements received and/or with the number of reflected light intensity measurements received. An example is illustrated in FIG. 4A, where measurements for reflected color and/or reflected light intensity are obtained at positions P1, P2, P3, P4, leading to an image composed of portions 402, 404, 406, 408.

Figure 4A:
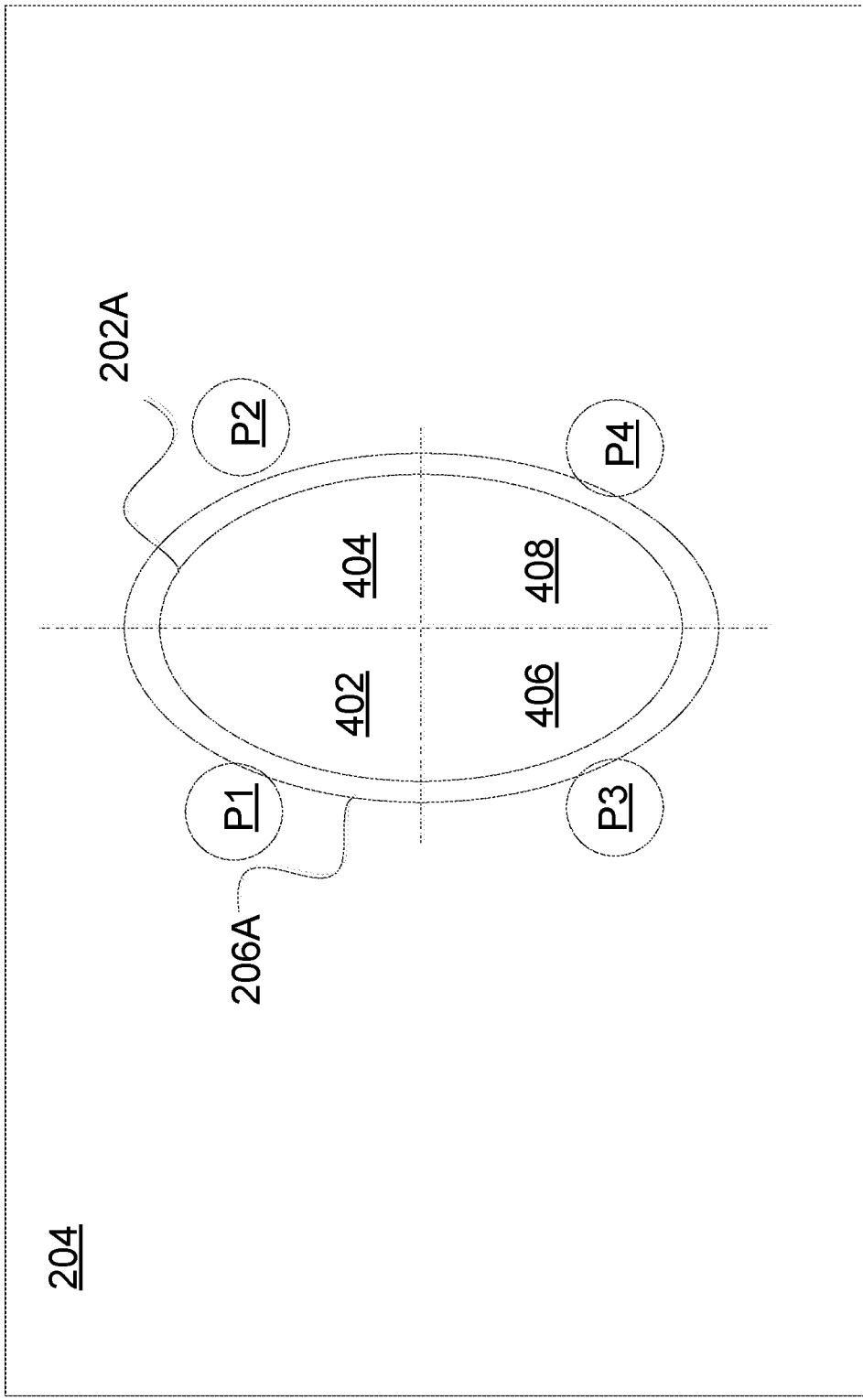
FIG. 4A is a schematic diagram to illustrate generation of an image in accordance with four measurement positions, in accordance with another illustrative embodiment.
Figure 4B:
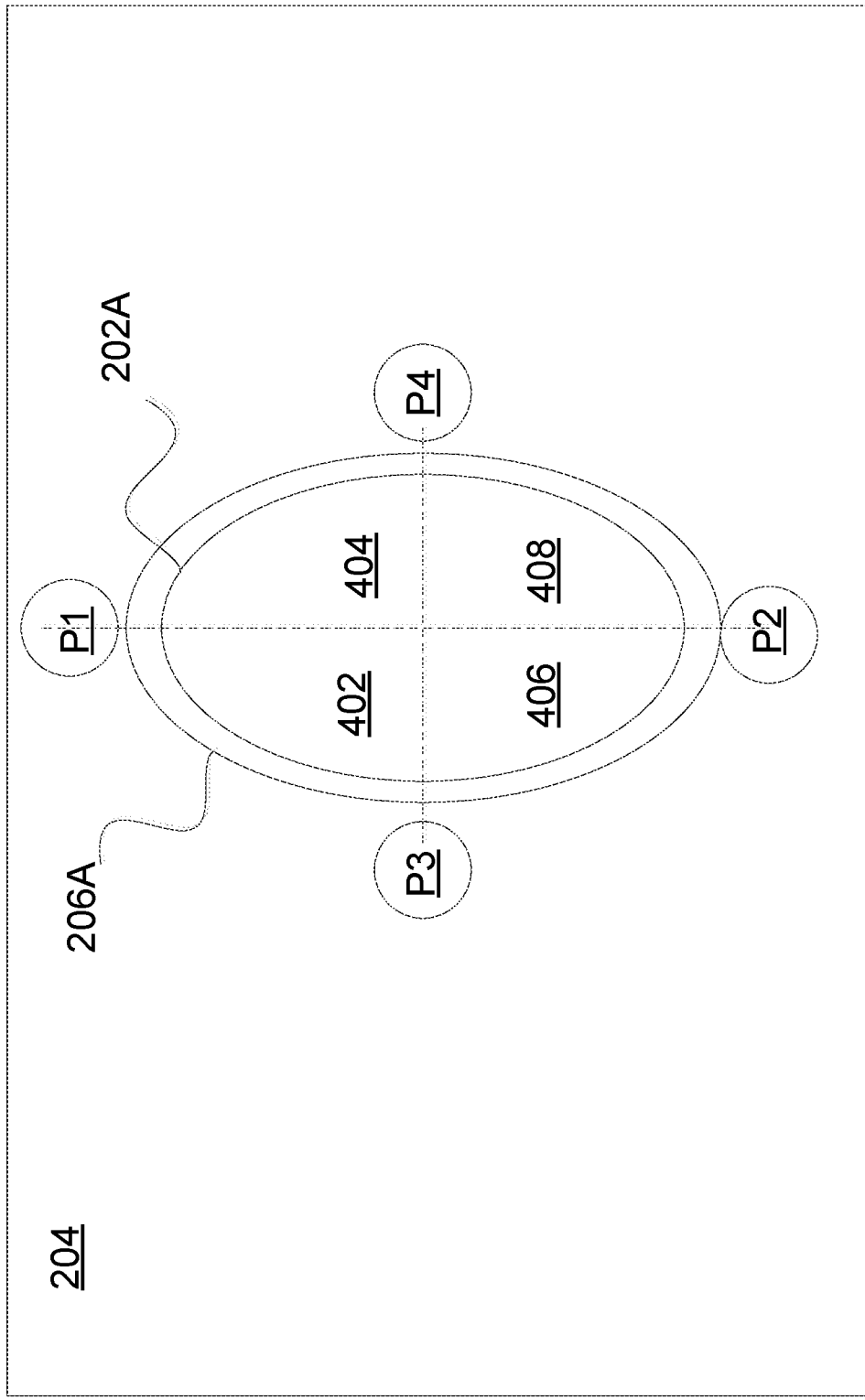
FIG. 4B is a schematic diagram to illustrate generation of an image when the reflected color measurement positions differ from the reflected light intensity measurement positions, in accordance with another illustrative embodiment.

In some embodiments, the reflected color measurement positions differ from the reflected light intensity measurement positions, as illustrated in the example embodiment of FIG. 4B. In this example, reflected color measurements are taken at P1, P2, and reflected light intensity measurements are taken at P3, P4. Portions 402 and 404 have image colors that match the reflected color measured at P1. Portions 406 and 408 have image colors that match the reflected color measured at P2. Portions 402 and 406 have image intensities that match the reflected light intensity measured at P3. Portion 404 and 408 have image intensities that match the reflected light intensity measured at P4.

Figure 4C:
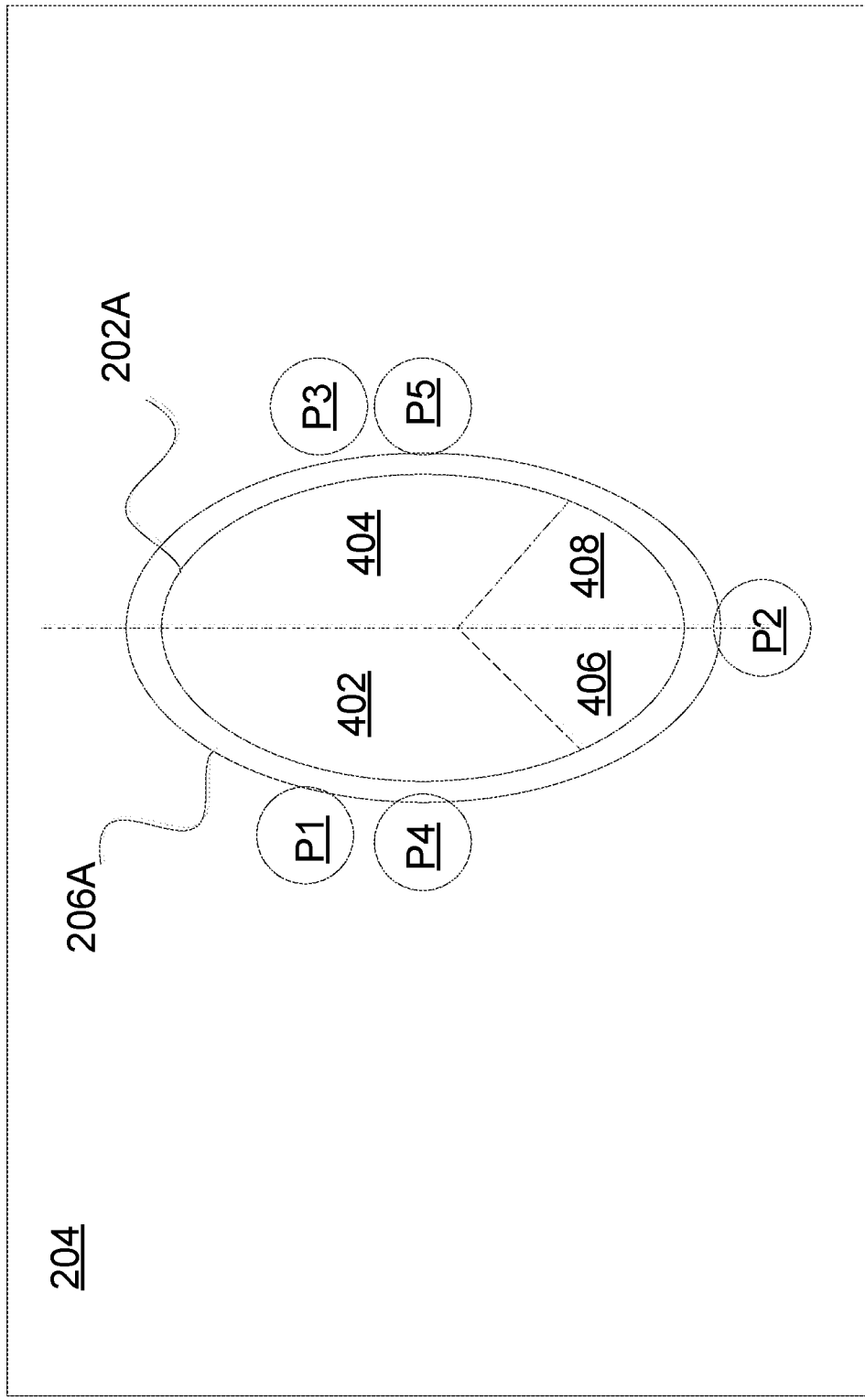
FIG. 4C is a schematic diagram to illustrate generation of an image when the number of reflected color measurement positions differs from the number of reflected light intensity measurement positions, in accordance with another illustrative embodiment.

In some embodiments, reflected colors are measured at a number of positions that differs from the number of positions where reflected light intensity is measured. An example is illustrated in FIG. 4C. Color is measured at three positions around the window 202a, at P1, P2, P3 while light intensity is measured at two positions around the window 202a at P4, P5. The image is composed of four different portions 402, 404, 406, 408. Portion 402 has an image color that matches the reflected color measured at P1 and an image intensity that matches the reflected light intensity measured at P4. Portion 404 has an image color that matches the reflected color measured at P3 and an image intensity that matches the reflected light intensity measured at P5. Portion 406 has an image color that matches the reflected color measured at P2, and an image intensity that matches the reflected light intensity measured at P4. Portion 408 has an image color that matches the reflected color measured at P2, and an image intensity that matches the reflected light intensity measured at P5.

More or less measurement positions may be used than what is shown in the examples illustrated in FIGS. 4A-4C. In some embodiments, a single measurement device is used to measure both reflected color and reflected light intensity. In this case, the measurement positions for reflected color and reflected light intensity are the same. In some embodiments, a same color measuring device 208a is used to measure reflected color at two or more positions by displacing the device 208a to have it pointing towards a given position when obtaining a given measurement. In some embodiments, a same light intensity measuring device 212a is used to measure reflected light intensity at two or more positions by displacing the device 212a to have it pointing towards a given position when obtaining a given measurement. Control and positioning of the devices 208a, 212a may be effected by the controller 210 or by another device. In some embodiments, each measurement device 208a, 212a is cycled through the various positions P1, . . . PN sequentially. The generated image may be adapted or modified by the controller 210 when a new color or light intensity is measured at a given position that differs from a color or light intensity previously measured at the given position. The measuring positions may be offset between the devices 208a, 212a, such that the color measurement device 208a starts measuring at position P1, for example, and cycles through to position PN while the light intensity measurement device 212a starts measuring at position P2, for example, and cycles through to position PN followed by position P1. Other measurement sequences may also be used.

Figure 5A:
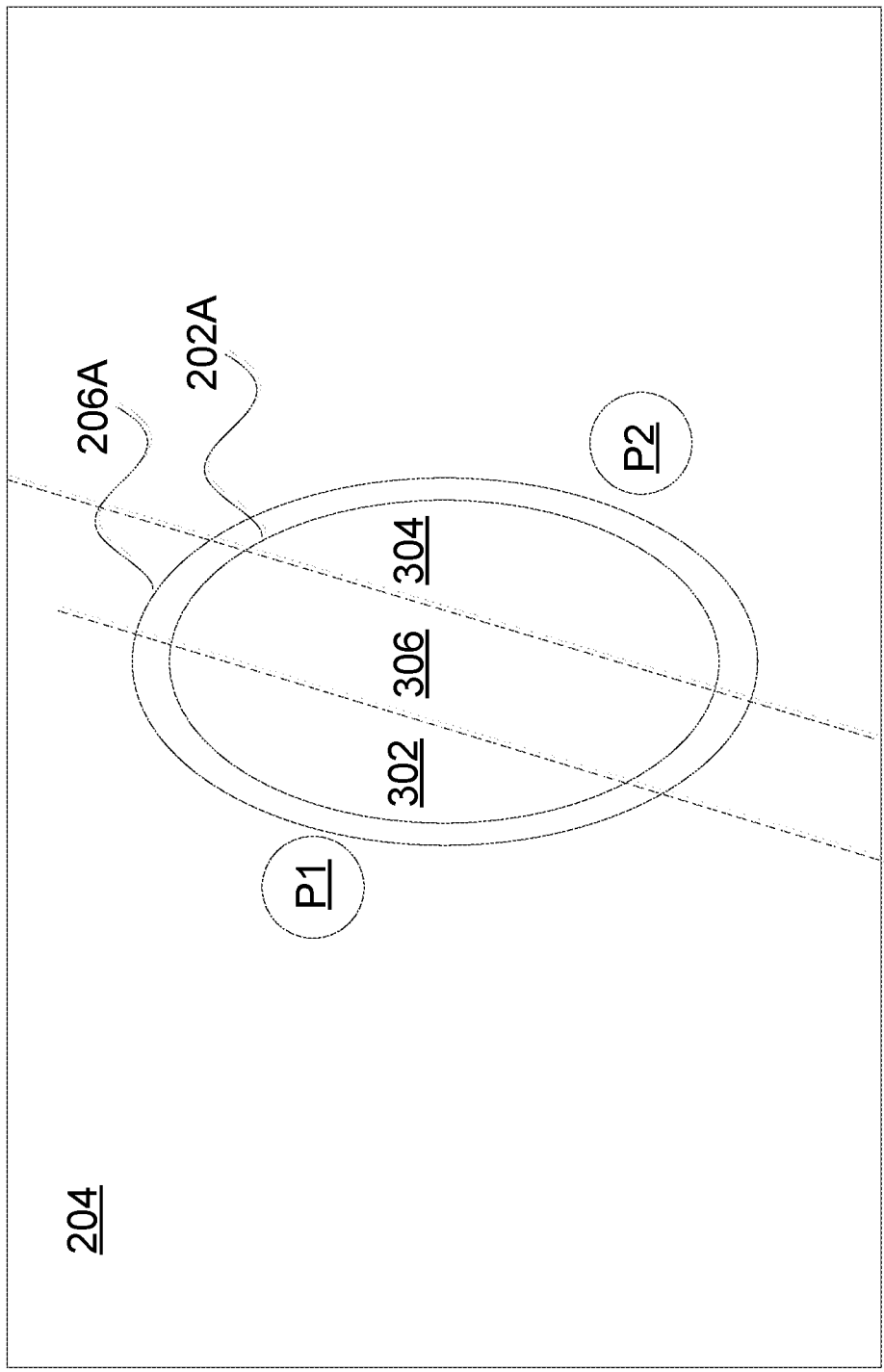
FIG. 5A is a schematic diagram to illustrate generation of an image with a gradient between two image portions, in accordance with another illustrative embodiment.

In some embodiments, the controller is configured for providing a gradient in color and/or light intensity in the image generated. An example is illustrated in FIG. 5A. Reflected color and/or reflected light intensity are measured at positions P1 and P2. Portion 302 of the image is set in accordance with the measurements obtained at P1. Portion 304 of the image is set in accordance with the measurements obtained at P2. Portion 306 of the image is set with a gradient to more smoothly transition from portion 302 to portion 304 and vice versa.

Figure 5B:
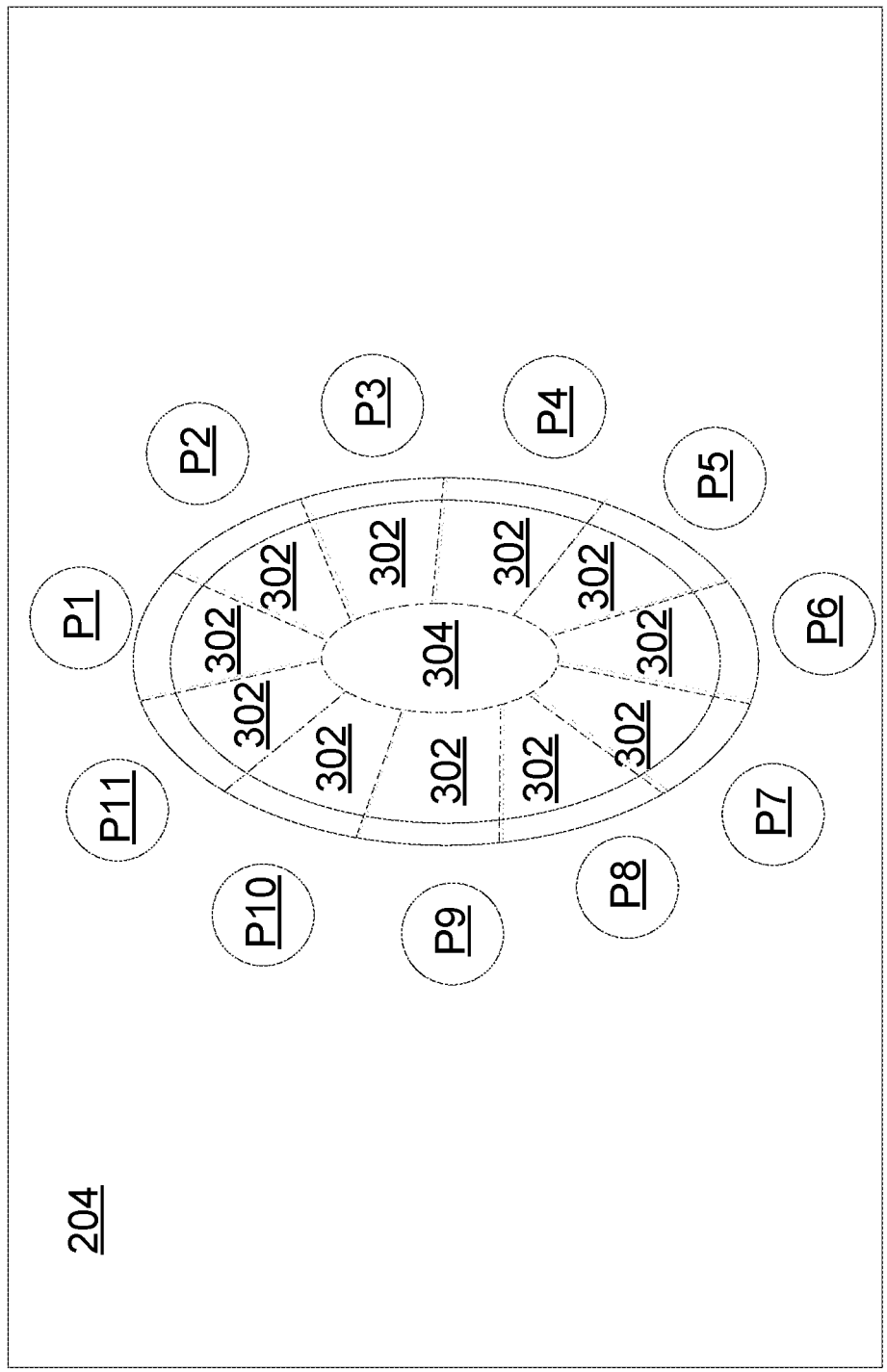
FIG. 5B is a schematic diagram to illustrate generation of an image with a gradient between multiple image portions, in accordance with another illustrative embodiment.

In some embodiments, the gradient is provided between more than two portions, as illustrated in the example of FIG. 5B. Color and/or light intensity measurements are taken around the window 202a, as positions P1, P2, P3, P4, P5, P6, P7, P8, P9, P10, P11. Portions 302 of the image are set in accordance with the measured color and/or light intensity measurements at respective ones of P1-P11. Portion 304 of the image is set with a gradient. A single gradient may be applied to portion 304. Alternatively, multiple gradients may be applied to portion 304 to more smoothly transition between the various portions 302 of the image.

Figure 6:
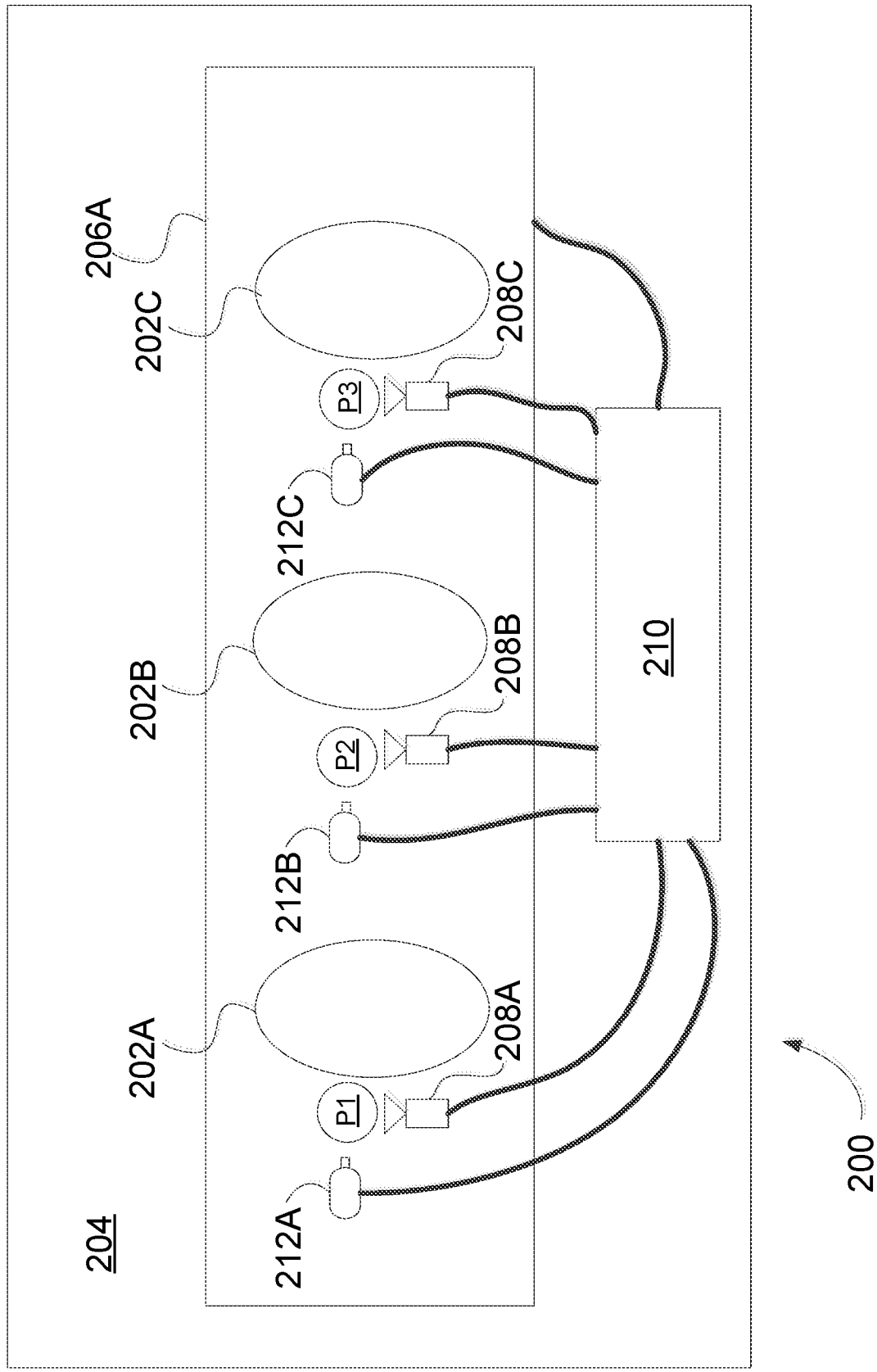
FIG. 6 is a schematic diagram of an aircraft cabin display system with a display device covering multiple cabin windows, in accordance with another illustrative embodiment.

In some embodiments, the display 206a extends over additional cabin windows 202b, 202c, as illustrated in the example of FIG. 6. In some embodiments, additional color measuring devices 208b, 208c and/or additional light intensity measuring devices 212b, 212c are provided for additional cabin windows 202b, 202c, respectively. The portion of the display that covers window 202a displays an image having an image color and/or an image intensity that corresponds to the reflected color and/or reflected light intensity measured at position P1. The portion of the display that covers window 202b displays an image having an image color and/or an image intensity that corresponds to the reflected color and/or reflected light intensity measured at position P2. The portion of the display that covers window 202c displays an image having an image color and/or an image intensity that corresponds to the reflected color and/or reflected light intensity measured at position P3. In some embodiments, a single color measuring device 208a is used to measure reflected colors at positions P1, P2, P3. In some embodiments, a single light intensity measuring device 212a is used to measure reflected light intensity at positions P1, P2, P3. In some embodiments, a single measurement device is used to measure both color and light intensity at positions P1, P2, P3.

In the example of FIG. 6, the image generated by the controller 210 and displayed on the display device 206a may comprise a plurality of individual images that are displayed at positions on the display that correspond to the positions of the cabin windows 202a, 202b, 202c. Sections of the display that do not correspond to the cabin windows 202a, 202b, 202c, for example sections of the sidewall 204 between windows 202a and 202b, and between windows 202b and 202c, may remain transparent. For example, if the display device 206a is an LED display, pixels aligned with cabin windows 202a, 202b, 202c are active while pixels unaligned with windows 202a, 202b, 202c are inactive.

Alternatively, a single image may be generated and displayed on the display device 206a. Pixels aligned with cabin windows 202a, 202b, 202c may be set to have colors and/or light intensity that match measured reflected colors and/or light intensities at corresponding positions P1, P2, P3 respectively. Pixels unaligned with cabin windows 202a, 202b, 202c may be set to recreate the sidewall 204 between respective ones of the windows 202a, 202b, 202c. In some embodiments, a gradient is applied to portions of the image between respective ones of the windows 202a, 202b, 202c, to smooth the transition between the portions of the image displayed over windows 202a, 202b, 202c.

Figure 7:
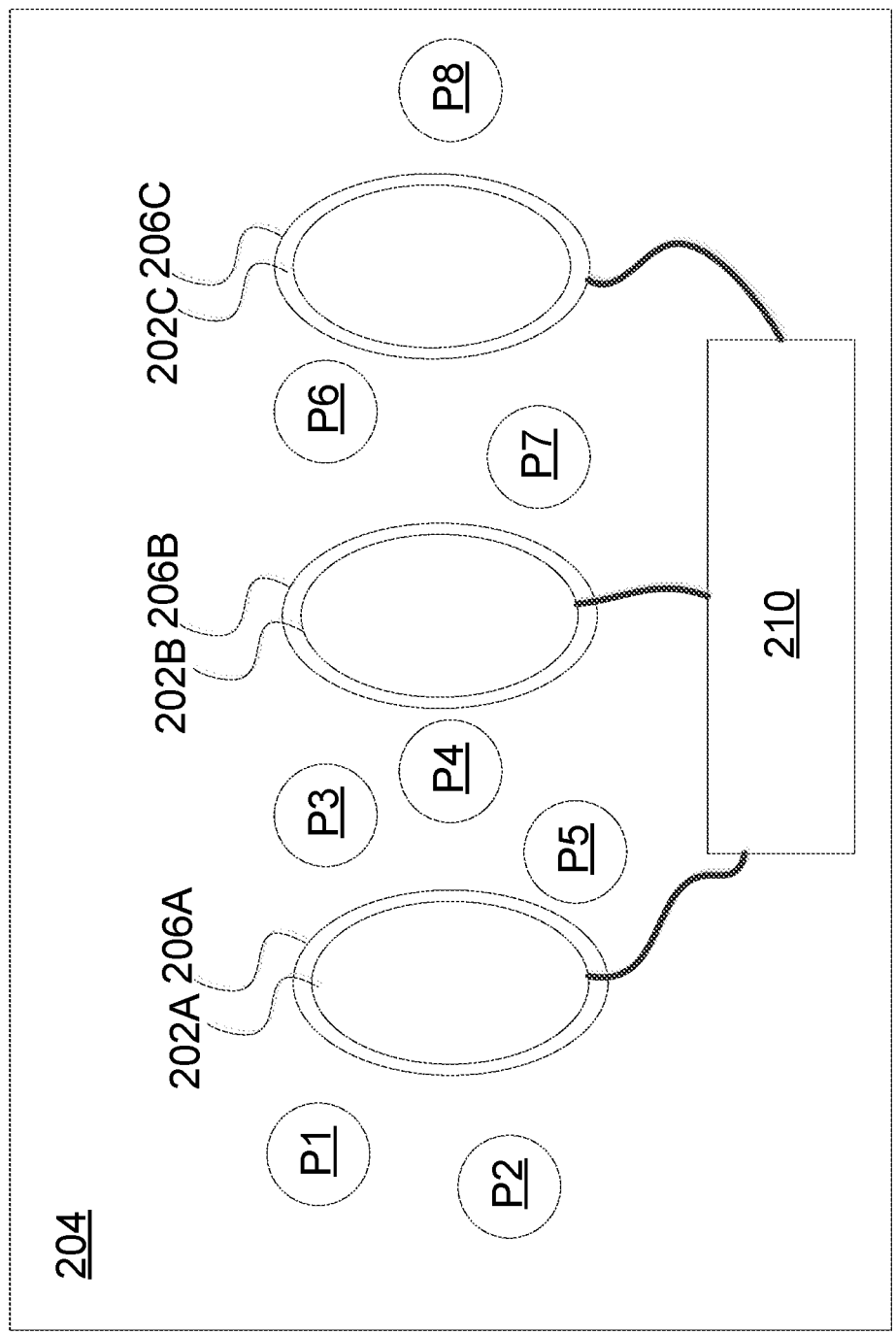
FIG. 7 is a schematic diagram to illustrate generation of images for multiple display devices, in accordance with another illustrative embodiment.

Referring to FIG. 7, there is illustrated another example embodiment. In this example, a plurality of display devices 206a, 206b, 206c are provided for cabin windows 202a, 202b, 202c, respectively. Each display device 206a, 206b, 206c is operatively connected to the controller 210. The controller 210 generates an image for each display device 206a, 206b, 206c as a function of color and/or light intensity measurements obtained on surfaces adjacent to each cabin window 202a, 202b. 202c. A combination of the embodiments illustrated in FIGS. 6 and 7 is also considered, whereby a first display device 206a extends over two or more cabin windows 202a, 202b, and one or more additional display device 206b, 206c is provided for additional cabin windows 202c. Various configurations may be used as a function of the setup of the interior of the passenger cabin in the aircraft 10.

The display devices 206a, 206b, 206c can operate in multiple modes. In a first mode the display devices 206a, 206b, 206c are transparent while in a second mode the display devices 206a, 206b, 206c are operative to display an image generated by the controller for color and/or light intensity matching. In some embodiments, the display devices 206a, 206b, 206c can also operate in a third mode as in inflight entertainment (IFE) system. In some embodiments, the display devices 206a, 206b, 206c can operate in both a color-matching mode (i.e. the second mode) and as an IFE system (i.e. the third mode) concurrently. Indeed, the color and/or intensity of the images displayed while in-use as an IFE system may be adapted as a function of the color and/or light intensity measurements obtained on surfaces adjacent to each cabin window 202a, 202b, 202c. In some embodiments, the display devices 206a, 206b, 206c can operate as IFE systems (i.e. the third mode) while the devices are transparent (i.e. the first mode). Individual passenger control may be provided to set the mode of operation, using for example a tactile screen for interactive operation or other input means.

In some embodiments, and as illustrated in FIG. 7, a plurality of positions P1-P8 are disposed pseudo-randomly around the plurality of cabin windows 202a, 202b, 202c. The controller 210 receives measurements taken at positions P1-P8 and considers the measurement for a given image as a function of its relative position with respect to a given cabin window. For example, the controller 210 may consider measurements taken at P1, P2, P3, and P5, and optionally P4, for the image generated for cabin window 202a. The controller 210 may consider measurements taken at P4 and P7, and optionally P3, P5, P6, for the image generated for cabin window 202b. The controller 210 may consider measurements taken at P6 and P8 and optionally P7 for the image generated for cabin window 202c. Other permutations are also considered. The measurement positions, number of measurements taken, and consideration of a given measurement for a given image or image portion should not be limited by the examples illustrated herein.

Figure 8:
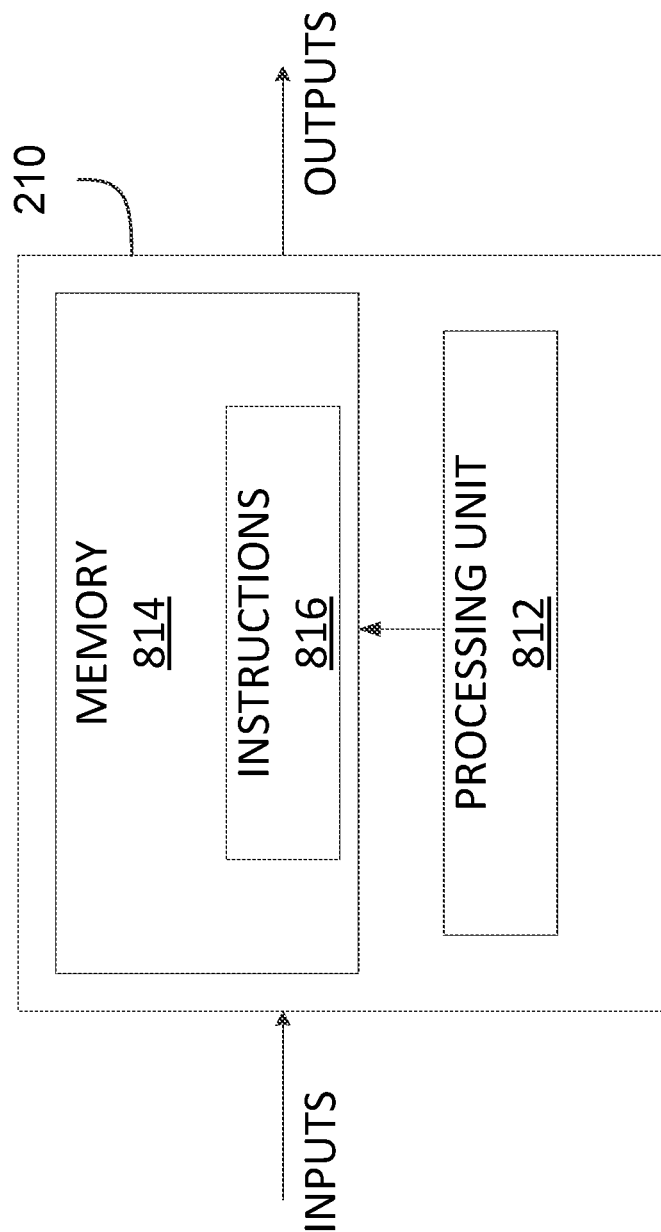
FIG. 8 is a block diagram of a controller of the aircraft cabin display system, in accordance with an illustrative embodiment.

With reference to FIG. 8, there is illustrated an example embodiment for the controller 210. A processing unit 812 and a memory 814 which has stored therein computer-executable instructions 816 are provided. The processing unit 812 may comprise any suitable device configured to implement the system such that instructions 816, when executed by the processing unit 812, may cause the functions/acts/steps as described herein to be executed. The processing unit 812 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to the controller 210, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means suitable for retrievably storing machine-readable instructions 816 executable by processing unit 812. In some embodiments, the controller 210 can be implemented as part of an inflight entertainment system of an aircraft.

Figure 9:
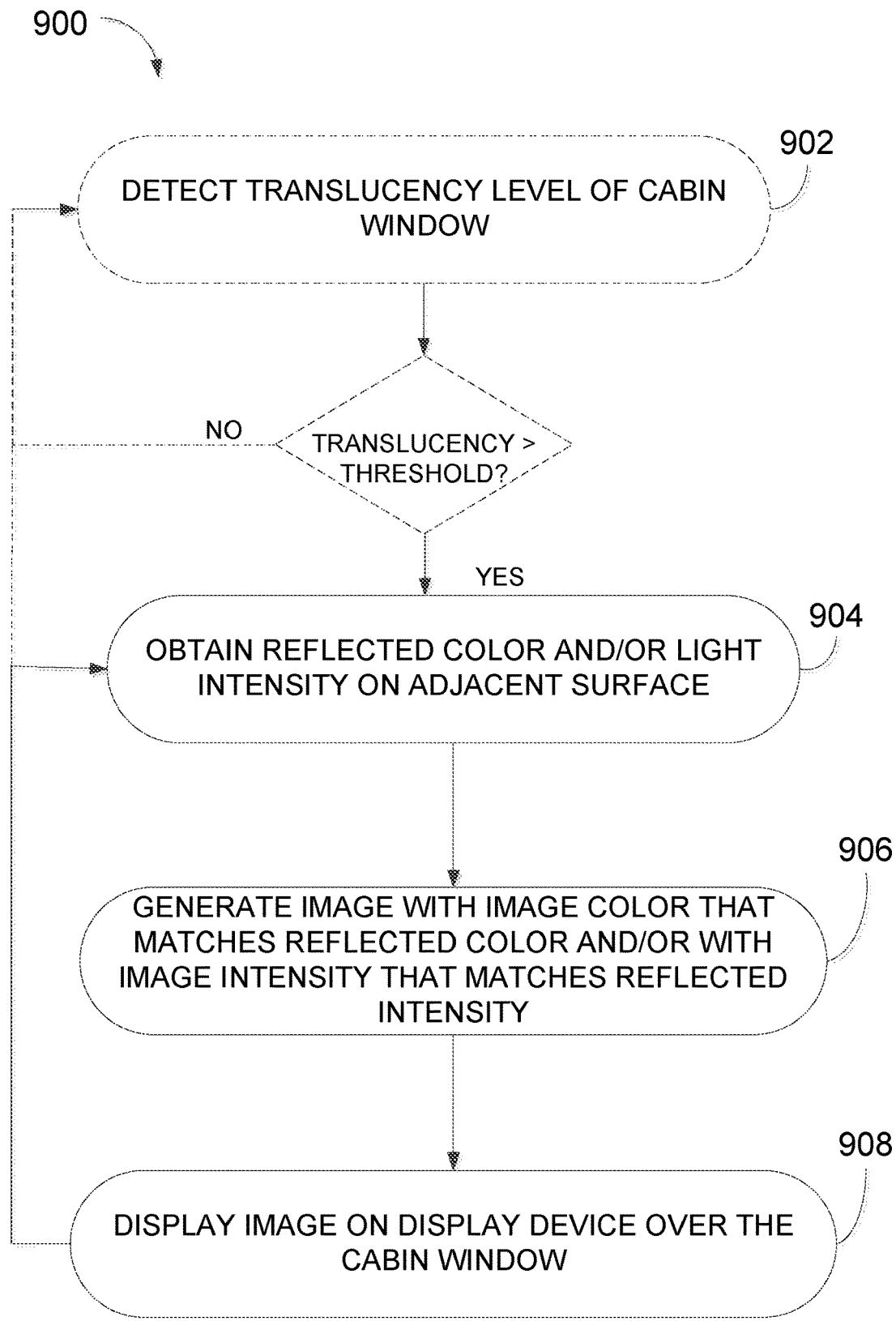
FIG. 9 is a flowchart of a method for controlling an aircraft cabin display, in accordance with an illustrative embodiment.

FIG. 9 illustrates an example method 900 for controlling the aircraft cabin display system 200. In some embodiments, method 900 is performed when instructions 816 are executed by processing unit 812. In a first optional step, the method 900 is enabled when a predetermined level of translucency of the cabin window is detected. At step 902, the translucency level of the cabin window is detected. If the detected translucency is below a threshold, step 902 is repeated. If the translucency is equal to or above the threshold, the method 900 moves on to step 904.

At step 904, the reflected color and/or light intensity is obtained on a surface adjacent to a cabin window of the aircraft 10. As indicated above, step 904 may take many forms, such as performing separate measurements for color and light intensity, taking measurements at a plurality of positions around the window, displacing one or more measuring device to obtain measurements at two or more positions, retrieving previously obtained measurements (reflected color and/or light intensity) from a storage device, and the like. In some embodiments, step 904 further comprises obtaining color and/or light intensity at surfaces adjacent to a plurality of windows.

At step 906, an image is generated having an image color and/or an image intensity in accordance with the reflected color and/or reflected light intensity. In some embodiments, step 906 comprises generating multiple images for multiple display devices associated with multiple cabin windows. In some embodiments, step 906 comprises generating an image having multiple portions, each portion having its own setting for image color and/or image intensity, for a single cabin window. In some embodiments, step 906 comprises generating an image having multiple portions, each portion for a given cabin window, each portion having sub-portions with its own setting for image color and/or image intensity.

In some embodiments, one or more gradient is applied to an image, to provide a smoother transition between color and/or light intensity settings of different portions of the image.

At step 908, at least one image is displayed on at least one display device over at least one cabin window. In some embodiments, step 908 comprises displaying the image over a portion of the display device. In some embodiments, step 908 comprises activating pixels of the display device that are aligned with cabin windows and deactivating pixels of the display device that are unaligned with cabin windows, for example pixels that are aligned with sidewalls of the cabin. In some embodiments, step 908 comprises displaying multiple images on a single display device that extends over multiple cabin windows. In some embodiments, step 908 comprises displaying one image with multiple portions on a single display device that extends over multiple cabin windows. In some embodiments, step 908 comprises displaying an image on each display device, for multiple display devices covering multiple cabin windows.

In some embodiments, the method 900 is performed dynamically as lighting conditions inside the aircraft cabin change. For example, if a passenger is watching a movie on a screen in proximity to the surface adjacent to the cabin window, and a light of a given coloring and/or intensity is projected onto the surface by the screen, the controller 210 would pick up on the change to the color and/or light intensity on the surface and generate an image for display on the display device accordingly, or update an already displayed image accordingly. Other conditions inside the cabin that may cause the reflected color and/or reflected light intensity at the surface adjacent to a cabin window to change are opening and closing of window shades of other windows in proximity to the cabin window, dimming or increasing the interior lighting of the cabin, changes to the opacity level of other windows in proximity to the cabin window, and the use of personal or individual lights by passengers in proximity to the cabin window.

The method 900 and controller 210 for controlling an aircraft cabin display described herein may be implemented in a high level procedural or object oriented programming or scripting language, or a combination thereof. Alternatively, the method 900 and controller 210 for controlling an aircraft cabin display may be implemented in assembly or machine language. The language may be a compiled or interpreted language. Program code for implementing the method 900 and controller 210 for controlling an aircraft cabin display may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the method 900 and controller 210 for controlling an aircraft cabin display may also be considered to be implemented by way of a non-transitory computer-readable storage medium having a computer program stored thereon. The computer program may comprise computer-readable instructions which cause a computer, or in some embodiments the processing unit 812 of the controller 210, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling an aircraft cabin display, the method comprising:
   measuring a reflected color on a surface adjacent to a cabin window of an aircraft that allows passage of light and through which a passenger may see outside of the aircraft;
   generating an image having an image color in accordance with the reflected color as measured on the surface adjacent to the cabin window; and
   displaying the image having the image color on a display device covering the cabin window to visually blend the window with the surface adjacent to the window,
   wherein:
      measuring the reflected color on the surface comprises measuring a first reflected color at a first position on the surface and measuring a second reflected color at a second position on the surface;
      generating the image comprises generating a first portion of the image in accordance with the first reflected color and generating a second portion of the image in accordance with the second reflected color; and
      a color gradient is applied across the first and second portions of the image displayed on the display device.

2. The method of claim 1, further comprising obtaining a reflected intensity of light at the surface adjacent to the cabin window, and wherein generating an image comprises generating the image with an image intensity in accordance with the reflected intensity.

3. The method of claim 1, wherein the first position and the second position on the surface adjacent to the cabin window are on opposite sides of the cabin window.

4. The method of claim 1, wherein the display extends over the cabin window and a plurality of additional cabin windows adjacent to the cabin window, and wherein displaying the image comprises displaying the image on a portion of the display covering the cabin window.

5. The method of claim 4, further comprising measuring additional reflected colors on respective surfaces adjacent to the plurality of additional cabin windows, generating respective additional images in accordance with the additional reflected colors as measured, and displaying the additional images on respective portions of the display covering the additional cabin windows.

6. The method of claim 5, wherein the plurality of additional cabin windows are separated by cabin wall sections, and further comprising rendering the display transparent over portions of the display corresponding to the cabin wall sections.

7. The method of claim 1, further comprising enabling the displaying of the image upon detection of a predetermined level of translucency of the cabin window.

8. The method of claim 1, wherein the method is applied dynamically as lighting conditions inside the aircraft cabin change.

9. A system for controlling an aircraft cabin display, the system comprising:
   a processing unit; and
   a non-transitory computer-readable medium having stored thereon program code executable by the processing unit for:
      measuring a reflected color on a surface adjacent to a cabin window of an aircraft that allows passage of light and through which a passenger may see outside of the aircraft;
      generating an image having an image color in accordance with the reflected color as measured on the surface adjacent to the cabin window; and
      displaying the image having the image color on a display device covering the cabin window to visually blend the window with the surface adjacent to the window;
   wherein:
      measuring the reflected color on the surface comprises measuring a first reflected color at a first position on the surface and measuring a second reflected color at a second position on the surface;
      generating the image comprises generating a first portion of the image in accordance with the first reflected color and generating a second portion of the image in accordance with the second reflected color; and
      a color gradient is applied across the first and second portions of the image displayed on the display device.

10. The system of claim 9, wherein the program code is further executable for obtaining a reflected intensity of light at the surface adjacent to the cabin window, and wherein generating an image comprises generating the image with an image intensity in accordance with the reflected intensity.

11. The system of claim 9, wherein the first position and the second position on the surface adjacent to the cabin window are on opposite sides of the cabin window.

12. The system of claim 9, wherein the display extends over the cabin window and a plurality of additional cabin windows adjacent to the cabin window, and wherein displaying the image comprises displaying the image on a portion of the display covering the cabin window.

13. The system of claim 12, wherein the program code is further executable for measuring additional reflected colors on respective surfaces adjacent to the plurality of additional cabin windows, generating respective additional images in accordance with the additional reflected colors as measured, and displaying the additional images on respective portions of the display covering the additional cabin windows.

14. The system of claim 13, wherein the plurality of additional cabin windows are separated by cabin wall sections, and further comprising rendering the display transparent over portions of the display corresponding to the cabin wall sections.

15. The system of claim 9, wherein the program code is further executable for enabling the displaying of the image upon detection of a predetermined level of translucency of the cabin window.

* * * * *